March 14, 1950     C. F. KRAMER     2,500,316
SEAT TRACK CONSTRUCTION
Filed Oct. 15, 1945
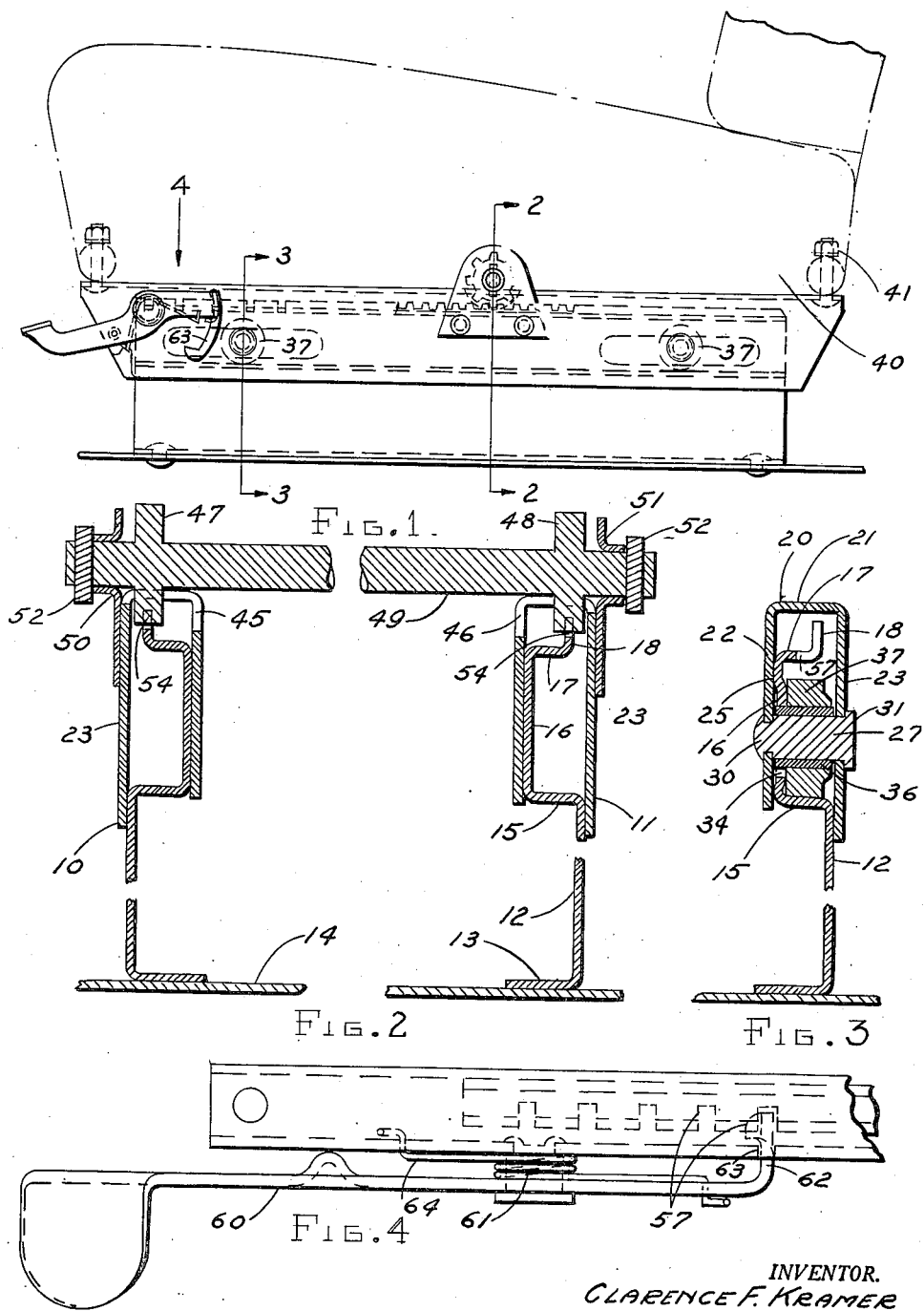
INVENTOR.
CLARENCE F. KRAMER Patented Mar. 14, 1950

2,500,316

UNITED STATES PATENT OFFICE 2,500,316

SEAT TRACK CONSTRUCTION

Clarence F. Kramer, Birmingham, Mich.

Application October 15, 1945, Serial No. 622,445

6 Claims. (Cl. 155—14)

The invention relates to motor vehicles and it has particular relation to a sliding seat support for the vehicle.

Sliding seats and track constructions for movably supporting a vehicle seat in a vehicle body are generally in use at the present time, and these constructions allow the seat to be moved forwardly and rearwardly at will. A readily releasable latching means holds the seat in any position of adjustment and it is the usual practice to co-ordinate the travel of opposite side edges of the seat. Constructions of this general order include a pair of upper tracks or members fastened to the bottom of the vehicle seat and a lower pair of track members fastened to the floor of the vehicle.

One object of the present invention is to provide an improved seat support or track construction for movably supporting a seat in a vehicle which may be manufactured inexpensively and readily assembled with the vehicle and seat.

Another object of the invention is to provide improvements in seat supports which facilitate manufacture of the construction from sheet metal while at the same time insuring a sufficiently close fit between relatively movable parts as to prevent noise or looseness.

Other objects of the invention will become apparent from the following specification, from the drawings relating thereto, and from the claims hereinafter set forth.

For a better understanding of the invention reference may be had to the drawings wherein:

Figure 1 is a side elevational view of a vehicle seat and support therefor as constructed according to one form of the invention;

Fig. 2 is a cross-sectional view on a larger scale taken substantially along the line 2—2 of Fig. 1;

Fig. 3 is a cross-sectional view on a larger scale taken substantially along the line 3—3 of Fig. 1; and, Fig. 4 is a fragmentary plan view on a larger scale of the front end of one of the track structures as seen substantially in the direction of the arrow indicated at 4.

Referring to Fig. 2 in particular, the seat support comprises a pair of laterally spaced track constructions indicated at 10 and 11, respectively, and since these are identical, only one will be described in detail. Referring to the construction 11, it comprises an elongated strip or track member 12 constructed of sheet metal and having a horizontal leg or flange 13 at its lower edge which is adapted to be fastened to the floor of the vehicle indicated at 14. Intermediate its upper and lower edges, the strip is angled or bent laterally to provide a track 15 and above this track the strip extends vertically as indicated at 16. The vertical portion terminates at its upper edge in a horizontal leg 17 substantially parallel to the track 15, and the leg 17 in turn terminates in a short vertical flange 18. It might be observed that the track 15 and flange 17 form a laterally open channel and that the track 15 and flange 13 also form a laterally open channel which opens in the direction opposite to the first channel.

As shown best by Fig. 3, the upper part of the track construction comprises an inverted U-shaped member 20 having a base 21 and legs 22 and 23 extending downwardly. These legs straddle the upper channel portion of strip 12, and it might be noted that the leg 23 projects downwardly and guidingly contacts the strip 12 below the track 15. Also it may be observed that the base or vertical portion 16 of the upper channel in strip 12 substantially contacts the inner surface of leg 22 of the U-shaped member 20 as indicated at 25, and this contact and the contact between the leg 23 and the lower part of strip 12, holds the track structure against lateral play while still permitting relative sliding movement as required.

A trunnion 27 is fastened to the leg 22 such as by riveting as indicated at 30 and the opposite end of the trunnion has a head 31 engaging the outer side of leg 23. This trunnion projects through an elongated slot 34 in the leg 16 of the upper channel in strip 12 and a sleeve roller 36 is provided on the trunnion. A second roller 37 is mounted on the sleeve roller 36 and the arrangement is such that the second roller will ride on track 15 with the end of the sleeve roller 36 substantially in contact with the upper edge of slot 34. This arrangement causes the track 15 to carry the load on the U-shaped member 20 and at the same time substantially close relation between the sleeve roller and upper edge of the slot prevents looseness or upper relative movement of the parts. It should be noted that there is a clearance between the sleeve roller and the lower edge of slot 34 so as to insure engagement between the roller 37 and the track. Each of the track constructions at the sides of the vehicle seat has two of the roller supports so that each of the two U-shaped members 20 is supported by a front roller and a rear roller.

The vehicle seat indicated at 40 in Fig. 1, is fastened to the base portion of the two U-shaped strips 20 as by means of bolts 41 and consequently the seat is supported by four of the rollers 37.

As a means of co-ordinating the travel on both of the track structures 10 and 11, the base portions of the U-shaped members 20 are provided with slots 45 and 46 which allow pinions 47 and 48 on a shaft 49 to project downwardly into the slots. The shaft 49 is journalled in bearing brackets 50 and 51 welded to the outermost legs 23 of the U-shaped members and suitable pins or the like 52 may be used to hold the shaft in its axial position. Each of the pinions 47 and 48 engages teeth 54 formed in the upwardly projecting leg of flange 18 and the arrangement is such that if either U-shaped member begins to move, the other U-shaped member must move also due to the co-ordinating teeth and pinion arrangement.

For the purpose of holding the seat in any position of adjustment, the leg 17 and flange 18 also are provided with a series of slots indicated at 57 in Figs. 3 and 4, and these slots are located toward the front end of the vehicle seat. A latching lever 60 is provided at one side of the seat and this lever is pivoted on a suitable trunnion 61 fastened to the outermost leg 23 of the U-shape member 20. The rear end of this member has a laterally extending finger 62 which extends through a vertical slot 63 in the leg 23 so that it may engage one of the slots 57, and the slot 63 is of such height that the finger 62 may be moved downwardly out of engagement with the slot 57 so as to permit adjustment of the seat. A suitable spring 64 co-operates with the lever 60 and leg 23 so as normally to urge the finger 62 upwardly into engagement with one of the slots 57 and the upper end of the slot 63 is so located that the finger will be maintained in engagement with the slot 57.

In the use of the construction the lever 60 is raised from its position shown in Fig. 1 and then if the seat is to be moved rearwardly pressure is applied against the back of the seat or lengthwise of the vehicle to move the seat. During such movement the rollers 37 will support the seat but the front sleeve rollers 36 will contact the upper edges of slots 34 and take any upward loads that may be present particularly in the event the seat is being adjusted rearwardly by the occupant applying pressure across the top of the seat back. In this case, the forces cause an upward load on the two front sleeve rollers, and during movement of the seat, the front sleeve rollers provide for rolling engagement while the two rear rollers 37 support the rear end of the seat.

Although only one form of the invention has been illustrated and described in detail, it will be apparent to those skilled in the art that various modifications may be made without departing from the scope of the claim.

What is claimed is:

1. A vehicle seat track construction comprising an elongated sheet metal strip disposed vertically and shaped in its upper portion to form a channel having its legs horizontal and its base vertical and laterally offset from the lower vertical portion of the strip, an inverted U-shape member having its legs vertically disposed in straddling relation to the channel, a horizontal trunnion extending between the legs of the U-shape member and secured thereto, the base of said channel portion having a slot extending lengthwise of the channel and through which the trunnion extends, a roller on the trunnion and disposed within the channel, said slot being wider than the trunnion and the roller being of such size that it rests on the lower leg of the channel, the upper leg of the channel having teeth for engaging a pinion, and a pinion turnably carried by the U-shape member and meshing with said teeth.

2. A vehicle seat track support comprising a sheet metal strip disposed vertically and angled intermediate its upper and lower edges to provide a horizontal leg or track portion, an inverted U-shape member having its legs straddling the upper portion of the strip, trunnion means extending horizontally between the legs of the U-shape member, the strip above said track portion having an elongated slot extending along the strip and which receives the trunnion, a roller on the trunnion means and resting on the track, the upper edge portion of the strip having teeth and the base of the U-shape member having a slot along said teeth, and pinion means turnably supported on the U-shape member and extending through said slot in the base of the U-shape member and engaging said teeth.

3. A vehicle seat track construction comprising a pair of laterally spaced sheet metal strips extending vertically with each strip bent intermediate its upper and lower edges to form a horizontal track and an upwardly extending part above the track, an inverted U-shape member straddling the upper portion of each strip, trunnion means extending between the legs of each U-shape member, the upwardly extending part of each strip having an elongated slot receiving said trunnion means, a roller on each trunnion means and resting on said track, a co-ordinating shaft extending between the U-shape members and journalled thereon, a pinion fixed on each end of the shaft, the base portion of each U-shape member having a slot to allow the pinion to project thereinto, and teeth on the upper edge portion of each strip and engaging said pinions respectively.

4. A vehicle seat support comprising vertically extending strip members disposed in vertically overlapping relation and adapted respectively to be secured to a lower support and to the seat, a trunnion secured to one strip and projecting horizontally through an elongated slot in the other, a sleeve roller on the trunnion and projecting into and substantially contacting the upper edge of the slot, roller means on the sleeve at the side of the slot, and means forming a track on the slotted member which contacts the lower side of the roller means at the side of the slot.

5. A vehicle seat support comprising a sheet metal strip which is bent intermediate its upper and lower edges to form a track and a vertically extending portion above the track, an inverted U-shape strip straddling the upper portion of the first strip, a transverse trunnion secured to the legs of the U-shape strip, said upper portion of the first strip having an elongated slot through which the trunnion extends, a sleeve roller on the trunnion and extending into the slot and substantially contacting the upper edge of the slot, and a roller on the sleeve at the side of the slot and resting on the track.

6. A vehicle seat track construction comprising a pair of laterally spaced sheet metal strips extending vertically with each strip bent laterally intermediate its upper and lower edges to form a horizontal track and an upwardly extending portion above the track with the portions above and below the track disposed in laterally offset relation, an inverted U-shape member straddling each strip and having one leg substantially in contact with and guided by the strip portion above the track and having its other leg projecting over that portion of the strip below the track and substantially in contact therewith so as to be guided thereby, a trunnion extending between the legs of each U-shape member and above the track, the upper portion of each strip having an elongated slot through which the trunnion extends, a roller on each trunnion and resting on the track below it, a co-ordinating shaft extending laterally of the U-shape members with its ends projecting laterally over the bases of the members respectively, each of said bases having a slot located below the shaft, a pinion fixed on each end of the shaft and partially projecting through the slot in the base below it, means rotatably supporting the ends of the shaft on the two U-shape members, and teeth on the upper edge of each strip and meshing with the adjacent pinion.

CLARENCE F. KRAMER.

REFERENCES CITED

The following references are of record in the file of this patent:

UNITED STATES PATENTS

| Number | Name | Date |
|---|---|---|
| 2,100,546 | Kramer | Nov. 30, 1937 |
| 2,102,226 | Saunders et al. | Dec. 14, 1937 |
| 2,126,142 | Saunders et al. | Aug. 9, 1938 |
| 2,240,143 | Lustig | Apr. 29, 1941 |